United States Patent [19]

Lunazzi

[11] Patent Number: 5,213,559
[45] Date of Patent: May 25, 1993

[54] APPARATUS FOR CHANGING BLANKS AND TOOL AUTOMATICALLY IN A GEAR CUTTING MACHINE

[75] Inventor: Alessandro Lunazzi, Bologna, Italy

[73] Assignee: Mikron S.p.A. Bologna, Bologna, Italy

[21] Appl. No.: 890,655

[22] Filed: May 28, 1992

[30] Foreign Application Priority Data

May 31, 1991 [IT] Italy ............................ B091A000190

[51] Int. Cl.$^5$ ............................................ B23Q 3/157
[52] U.S. Cl. .......................................... 483/14; 409/7; 483/31
[58] Field of Search ......................... 483/14, 31, 67, 37, 483/34, 18; 414/753, 223, 226; 409/7

[56] References Cited

U.S. PATENT DOCUMENTS

| | | | |
|---|---|---|---|
| 3,659,496 | 5/1972 | Bergemann | 409/7 X |
| 3,821,835 | 2/1974 | St. Andre et al. | 29/36 |
| 4,287,659 | 9/1981 | Erhardt et al. | 483/34 X |
| 4,359,815 | 11/1982 | Toyoda | 483/14 |
| 4,404,727 | 9/1983 | Zankl | 483/14 |
| 4,587,716 | 5/1986 | Byton | 483/14 |
| 4,590,661 | 5/1986 | Lunazzi | 483/18 |
| 4,599,786 | 7/1986 | Uhtenwoldt | 483/18 X |
| 4,736,512 | 4/1988 | Gusching et al. | 483/14 |
| 4,744,707 | 5/1988 | Negri et al. | 409/7 |
| 4,759,113 | 7/1988 | Hunkeler | 483/13 |

FOREIGN PATENT DOCUMENTS

| | | |
|---|---|---|
| 0028735 | 5/1981 | European Pat. Off. . |
| 1074367 | 1/1960 | Fed. Rep. of Germany ......... 409/7 |
| 1285842 | 12/1968 | Fed. Rep. of Germany . |
| 2818018 | 11/1979 | Fed. Rep. of Germany . |
| 3216716 | 12/1982 | Fed. Rep. of Germany . |
| 2570630 | 3/1986 | France . |
| 89540 | 6/1982 | Japan .................... 483/31 |
| 44243 | 3/1985 | Japan .................... 483/31 |
| 2075893 | 11/1981 | United Kingdom . |
| 8806944 | 9/1988 | World Int. Prop. O. ............ 483/31 |

OTHER PUBLICATIONS

Werkstaat & Betrieb, vol. 120, No. 10, Oct. 1987, Munich, Germany, pp. 833-836.

G. J. Kimmet, Automone Zahnrad-Fertigungszellen, p. 835, right column, Lines 5-13, FIG. 3.

*Primary Examiner*—William Briggs
*Attorney, Agent, or Firm*—Dvorak and Traub

[57] ABSTRACT

The apparatus is one by which blanks are changed automatically in a hobbing machine of the general type comprising at least one tool head capable of movement along horizontal and vertical axes and consisting essentially in a horizontal spindle and a coaxial outer bearing that can be moved toward and away from one another, between which a tool is supported and set in rotation; in the apparatus disclosed, a vertical post rotatable about its own axis carries a number of peripheral supports that feature two dissimilar structures, the one designed to restrain and/or support a tool and the other a blank, in such a way that the tool currently fitted to the head can be discarded and a replacement tool supplied automatically, utilizing the one type of support, whilst the blanks are changed by the other type.

7 Claims, 2 Drawing Sheets

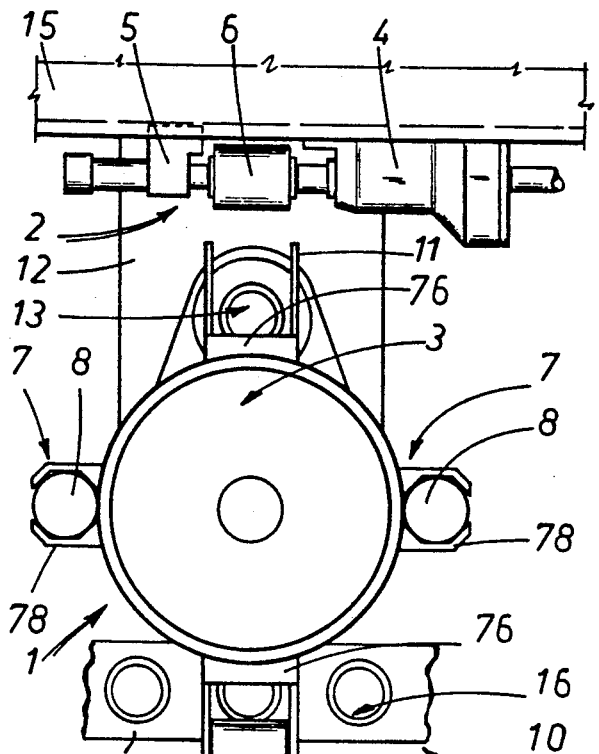
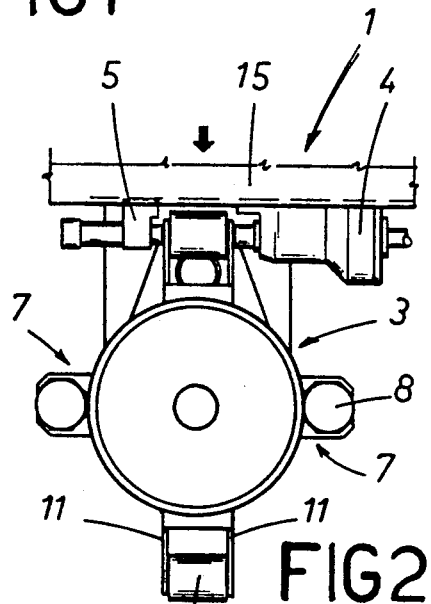
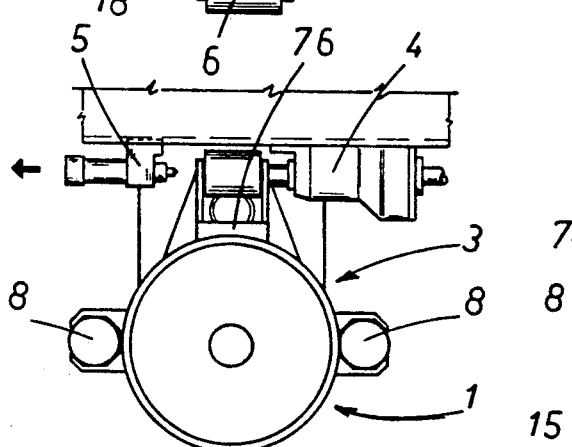
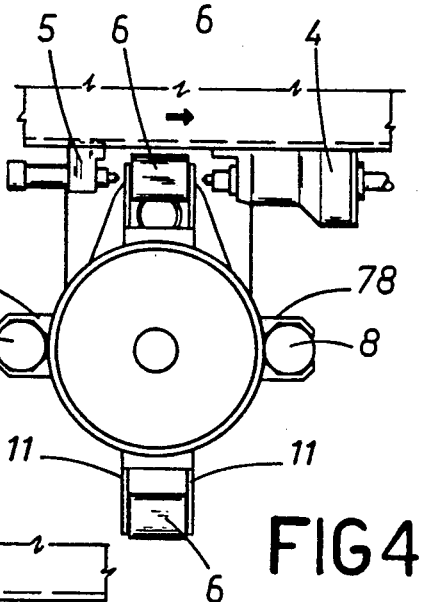
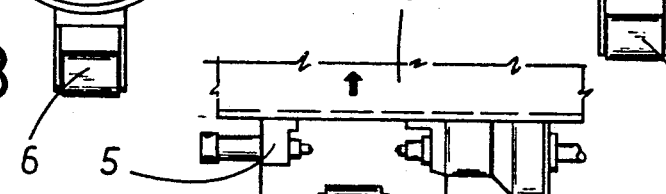
FIG1
FIG2
FIG3
FIG4
FIG5

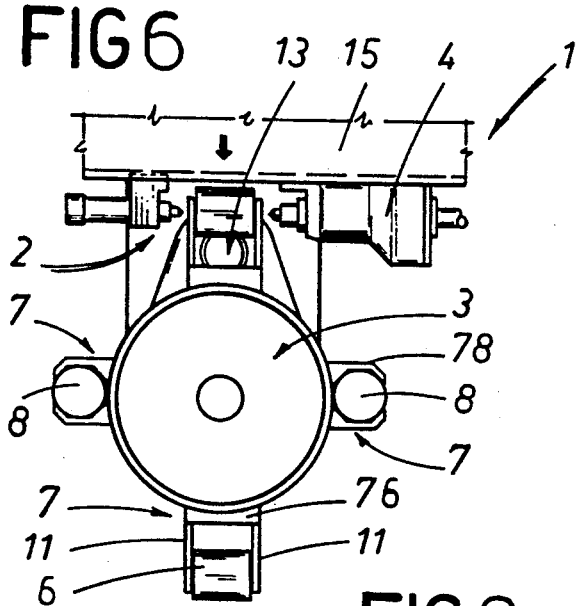
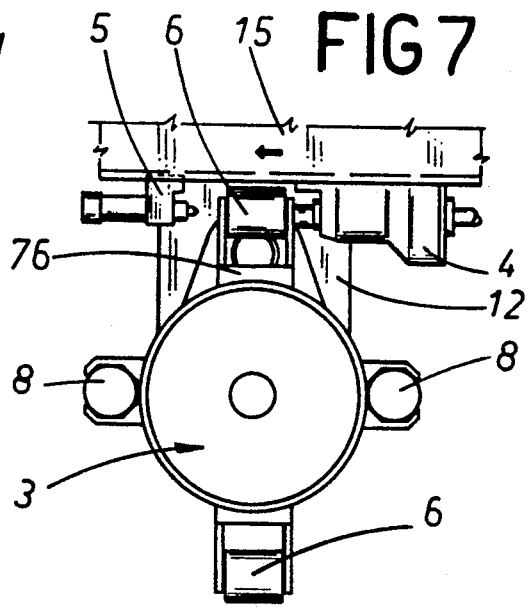
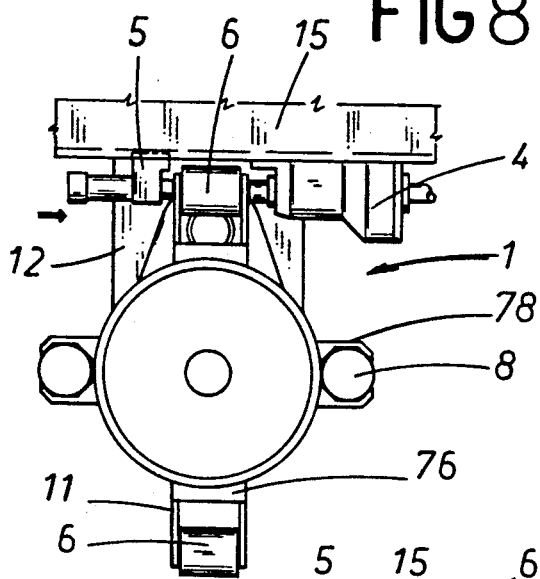
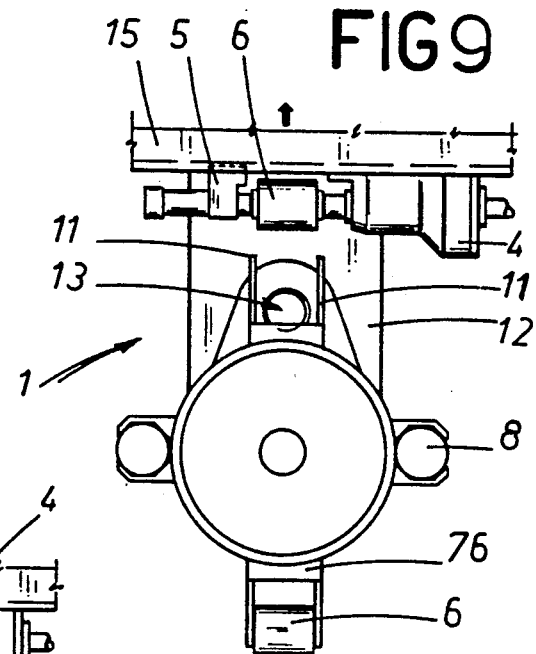
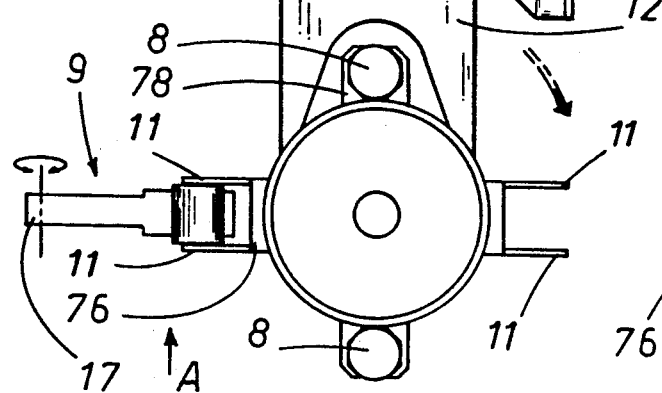
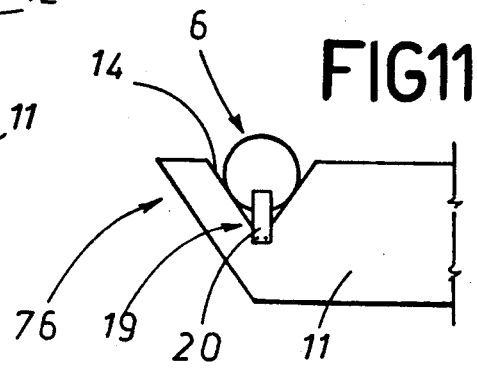

APPARATUS FOR CHANGING BLANKS AND TOOL AUTOMATICALLY IN A GEAR CUTTING MACHINE

BACKGROUND OF THE INVENTION

The present invention relates to an apparatus for changing the workpieces and tool automatically in a gear cutting machine.

Hobbing type gear cutters generally comprise a head capable of both vertical and horizontal movement, to which the hob is mounted. The head is composed of a spindle and a support or bearing, horizontally and coaxially disposed, between and by which the hob is supported and set in motion. The spindle and the bearing are capable of movement independently, toward and away from one another such that the tool can be clamped and released, respectively.

The entire head is capable of horizontal movement toward a station equipped with means by which the blanks for cutting are supported and set in motion. In most instances, the machine is equipped with an apparatus consisting in a vertical post rotatable about its own axis, by which each successive piece cut is replaced with a fresh blank automatically. Such apparatus affords a plurality of peripherally disposed restraining and/or supporting elements by which the blanks are picked up from a feeder and transferred to and from the machining station. Tool change on the other hand is generally a manual operation, not least by reason of the fact that the cutter is changed less frequently than the work. It happens nonetheless that machines capable of cutting significantly large blanks utilize tools of some considerable weight, the handling of which is laborious for a machine operator, and hazardous too in the case of a hob due to the particular geometry and sharpness of the cutting edges. The replacement of the tool is rendered still more difficult by the small amount of room existing between the tool head on the one hand, and the blank, or the restraining and/or support elements associated with the post which carry the blank, on the other.

Accordingly, the object of the present invention is to provide a simple apparatus for association with gear cutting machines, by which cutting tools can be changed automatically.

SUMMARY OF THE INVENTION

The stated object is realized by adoption of the apparatus according to the invention, which is of the type used for changing blanks in a gear cutting machine typically comprising a tool or hobbing head mounted to a relative bed and capable of movement both vertically and along a horizontal axis, and means of supporting and rotating a blank, mounted to the selfsame bed; the head is composed of a spindle and a bearing block disposed mutually coaxial and horizontal and capable of movement toward and away from one another, between and by which a tool is supported and set in rotation about their common axis, and the apparatus consists in a vertical post affording a plurality of peripheral elements by means of which to restrain and/or to support respective blanks in angularly equispaced positions relative to an axis about which the post is rotatable to the end of bringing each restraint and/or support element into a position over the means by which the blank is supported and rotated. In the apparatus disclosed, the restraint and/or support elements exhibit two dissimilar types of structure, the one type designed to restrain and/or support a tool, the other type to restrain and/or support a blank, and the hobbing head is capable of movement toward and away from the vertical post, piloted by a central monitoring and control unit, in such a way as to effect a change of tool.

BRIEF DESCRIPTION OF THE DRAWINGS

The invention will now be described in detail, by way of example, with the aid of the accompanying drawings, in which:

FIG. 1 provides a schematic representation of the apparatus according to the present invention, seen associated with a hobbing machine;

FIGS. 2 ... 10 are smaller scale representations of the apparatus of FIG. 1 illustrating a sequence of operating configurations assumed subsequent to that of FIG. 1, during the replacement of a tool;

FIG. 11 shows a detail of FIG. 10 viewed from A.

DESCRIPTION OF THE PREFERRED EMBODIMENTS

With reference to the accompanying drawings, a gear cutting machine to which the apparatus according to the invention typically lends itself is of the type comprising a tool or hobbing head 2 capable both of movement in a horizontal direction and of ascending and descending motion. The head 2 is composed of a spindle 4, generally fixed, and a separate coaxial bearing block 5 capable of movement in a horizontal direction, between and by which a tool 6 is carried and set on rotation about their common axis. The head 2 is mounted to a first post 15, which in turn is mounted to and capable of movement horizontally along a bed 12. The machine further comprises means denoted 13, supported by the bed 12 in a position adjacent to the spindle 4 and the bearing 5, by which successive blanks 8 are supported and set in rotation.

The apparatus 1 according to the invention consists in a second vertical post 3 equipped peripherally with a plurality of elements 7 by means of which to restrain and/or support the single blanks 8. The restraint and/or support elements 7 are set apart at identical angular distances around the vertical axis of the post 3, which is rotatable about this same axis through the agency of drive means (not illustrated) in such a way that there is always one restraint and/or support element 7 stationed above the support and rotation means 13.

According to the invention, the restraint and/or support elements 7 exhibit two dissimilar types of structure, one denoted 76 that serves to support a tool 6, the other denoted 78 serving to support a blank 8, and the movements involved in changing the tool 6 are performed by the hobbing head 2.

The apparatus comprises an even number of restraint and/or support elements 7, half of which are of the type designed to restrain and/or support a tool 6, and half of the type designed to restrain and/or support a blank 8. As discernible from the drawings attached, the one type of element 76 lies between two elements 78 of the other type, and viceversa. In the example illustrated, the vertical post 3 of the apparatus carries one pair of elements 76 for the restraint and/or support of a tool 6 and a pair of elements 78 for the restraint and/or support of a blank 8, all of which converging at right angles on a central point and arranged in such a way that the two restraint and/or support elements 7 of the same type are diametrically opposed in relation to the axis of rotation of the post 3.

Discounting a description of the elements 78 that serve to restrain and/or support a blank 8, given that these are conventional in embodiment, the elements 76 for the restraint and/or support of a tool 6 are disposed mutually parallel, and in the situation when either element 76 is stationed over the support and rotation means 13, parallel also with the common axis of the spindle 4 and bearing block 5. The two elements 76 are of substantially cradle-like embodiment, or in any event shaped so as to provide a longitudinal seating of which the longitudinal sides are profiled in such a way as to create a substantially Vee shaped rest affording a suitable support for tools 6 of different diameter. The tool restraint and/or support elements 76 might be embodied, as illustrated in FIG. 11, simply as a pair of vertical plates 11 disposed parallel to a common diametral plane passing through the axis of rotation of the vertical post 3, with respective Vee notches 14 combining to create the longitudinal seating. The distance between the plates 11 can be either fixed, or made adjustable through the agency of means (not illustrated) piloted from a central monitoring and control unit, according to the size of the tool 6 being handled.

The operation of the tool head 2 and the vertical post 3 is interlocked to the same control unit, by which at least the full tool change operation will be piloted according to the following description, and to the illustrations provided by the drawings. The moment that the control unit is in receipt of a tool change signal, the vertical post 13, which in normal operation will be positioned with one of the blank-holding restraint and/or support elements 78 stationed nearest the tool 6 and over the support and rotation means 13, is rotated through an angle such that the latter position is taken up by a free tool-holding restraint and/or support element 76. A new or different tool 6 is now positioned on the restraint and/or support element 76 farthest from the head 2, manually or automatically, and at the same time the head 2 is traversed toward the post 3 into a position whereby the tool 6 hitherto in use lies directly above the restraint and/or support element 76 stationed over the support and rotation means 13. Should the tool 6 have ceased operation at a height lower than that of the restraint and/or support element 76, the head 2 will ascend before traversing toward the post 3. Once in position, the head 2 can be lowered to the point of settling the tool 6 on the restraint and/or support element 76, whereupon the spindle 4 and then the bearing 5 are distanced from the tool to free it. The head 2 is then drawn back from the post 3, allowing the post to rotate 180° and bring the replacement tool 6 over the support and rotation means 13. The head 2 now approaches the post 3 again and the spindle 4 and bearing 5 are drawn together, closing on the new tool 6 from either end. Finally, the head 2 is raised and distanced from the vertical post 3, which rotates 90° to position a further blank 8 over the support and rotation means 13.

The object stated at the outset is thus realized in an apparatus 1 according to the invention, which affords the advantages of economy and ease of use. Conversely to what might be imagined, the use of the vertical post 3 as a change facility both for tools 6 and for blanks 8 will jeopardize neither the output capacity nor the operating speed of the machine, since cutting times for blanks 8 of larger dimensions, in particular, tend in any case to be lengthy.

A further advantage of the invention is that by leaving the tool restraint and/or support elements free during normal cutting cycles, the post 3 is not unnecessarily burdened by the mass of several blanks 8 awaiting their turn to be machined.

In smaller hobbing machines, an apparatus according to the present invention can be made advantageously to operate in conjunction with a feeder 9 supplying tools 6, for example a conveyor (not illustrated) and a pickup/transfer arm 17, and with a feeder 10 supplying the blanks 8, for example a conveyor 18 affording respective seatings 16; by interlocking the operation of the feeders 9 and 10 to the same central control unit, the operation of the machine as a whole becomes more fully integrated, with the apparatus 1 effectively linking the feeders 9 and 10 and the cutting station.

Given that the tool 6 will always cease rotation in the same angular position, the option also exists, to advantage, of embodying the relative restraint and/or support elements 76 with respective timing means 19 by which to determine the position of the tool 6 in relation to the element 76. Such means 19 might be embodied as a key 20 rigidly associated with the vertical plate 11 and insertable in a corresponding slot afforded by the tool 6.

The apparatus according to the present invention is especially advantageous and functional when used in conjunction with a hobbing machine as disclosed in a parallel application for patent under the title "A GEAR HOBBING MACHINE WITH AN ARBORLESS SYSTEM OF SUPPORTING THE HOB". Dispensing with the hob arbor, in effect, the overall dimensions of the vertical post 3 when rotating with the tool are considerably reduced, as also is the distance traversed by the tool post 15 when withdrawing to allow the rotation of the apparatus.

What is claimed:

1. An apparatus for automatically changing blanks in a gear cutting machine, comprising:
   a tool head mounted to a machine bed, said tool head capable of movement along both a vertical and a horizontal axis, the tool head having a spindle and a bearing block disposed about a common horizontal axis and capable of movement toward and away from one another, between and by which a tool is supported and set in motion about the common axis;
   means for supporting and rotating a blank;
   a vertical post rotatable about a vertical axis and having a plurality of restraint and/or support elements exhibiting two dissimilar types of structure, the one type designed to restrain and/or support a blank and the other to restrain and/or support a tool, peripherally disposed in angularly equispaced positions about the vertical axis so that each element can be brought by rotation of the post into a position over the means by which the blank is supported and rotated;
   a central monitoring and control unit by which the tool head is caused to traverse toward and away from the vertical post and to interact with the restraint and/or support elements to automatically bring about a change of tool.

2. An automatic apparatus according to claim 1, wherein the vertical post affords an even number of restraint and/or support elements, one half of the type structured to restrain and/or support a blank and the remaining half of the type structured to restrain and/or support a tool, arranged such that each restraint and/or support element of the one type is interposed between two elements of the dissimilar type.

3. An automatic apparatus according to claim 2, wherein the vertical post affords two pairs of restraint and/or support elements, one pair of the type structured to restrain and/or support a blank, the remaining pair of the type structured to restrain and/or support a tool, and is capable of rotation about its own vertical axis during replacement of a tool, and during replacement of a blank, between two positions diametrically opposed in relation to the axis of rotation.

4. An automatic apparatus according to claim 3, wherein the diametrically opposed positions coincide with positions in which the respective restraint and/or support elements take up and release a tool or a blank at corresponding stations of a gear cutting machine and of a relative feeder.

5. An automatic apparatus according to claim 1, wherein the element structured to restrain and/or support a tool consists in a pair of vertical plates disposed parallel to a diametral plane passing through the axis of rotation of the vertical post and affording a respective pair of V-shaped notches functioning as a longitudinal seating for the tool.

6. An automatic apparatus according to claim 5, wherein at least one of the vertical plates is adjustable for position according to the size of the tool, by movement parallel with itself toward or away from the other plate.

7. An automatic apparatus according to claim 1, wherein at least one of the elements structured to restrain and/or support a tool comprises respective means by which to determine the angular position of the tool in relation to the element itself.

* * * * *